Oct. 8, 1968  N. C. WILLIAMS ET AL  3,404,867
TURBINE WHEEL
Filed April 3, 1967  2 Sheets-Sheet 1

Norman C. Williams
Harry F. Everett
INVENTORS
BY Kolisch + Hartwell
Attys.

Oct. 8, 1968  N. C. WILLIAMS ET AL  3,404,867
TURBINE WHEEL

Filed April 3, 1967  2 Sheets-Sheet 2

Norman C. Williams
Harry F. Everett
BY  INVENTORS

Kolisch + Hartwell
Attys.

United States Patent Office 3,404,867
Patented Oct. 8, 1968

3,404,867
TURBINE WHEEL
Norman C. Williams, Portland, and Harry E. Everett, Lake Oswego, Oreg., assignors to Power Brake Equipment Company, Portland, Oreg., a corporation of Oregon
Filed Apr. 3, 1967, Ser. No. 627,716
5 Claims. (Cl. 253—2)

ABSTRACT OF THE DISCLOSURE

A viscous drag turbine wheel for a pneumatic motor comprising spaced, opposed, imperforate, circular shrouds mounted on an arbor and a stack of discs mounted side by side between the shrouds, said discs including equally circumferentially spaced arms radiating from the hubs separated by arcuately outlined pockets, and the discs being offset at regular angular modules about the arbor axis with the pockets collectively forming helically curving voids about the circumference of the wheel which mutually intersect with each other.

---

This invention relates to fluid-powered motors, and more particularly, to an improved construction for a turbine wheel for such motors.

The specific embodiment of the invention described herein comprises a turbine wheel for a pneumatic motor of the type that might be employed in a high-speed dental handpiece. Certain features of the turbine wheel construction make it well suited for such an application, although it is appreciated that the turbine wheel has other applications than in the dental handpiece disclosed herein.

Generally, an object of this invention is to provide an improved construction for a viscous drag turbine wheel, found to offer a high degree of resistance to the flow of a stream of fluid directed against the periphery thereof.

A special feature of the turbine wheel of the invention is that it may be very simply assembled from easily manufactured parts. This is especially advantageous in wheels such as are used in dental handpieces, which are quite small and require precise manufacture if they are to operate properly.

Another object and feature of the invention is the provision of an improved turbine wheel which at all points about its circumference offers substantially uniform resistance to the movement of a fluid under pressure across its periphery. As will be described, the turbine wheel may be used in a handpiece featuring gas bearing assemblies supporting a rotatable spindle, and it is important in inhibiting locking of the parts at start-up when normal operational conditions have not yet been established in the gas bearing assemblies, that the wheel, irrespective of its particular position in the motor, offer the required resistance to flow of a stream of fluid passed thereover. Furthermore, in certain wheels, such as those of the bucket type where certain regions of the wheel catch a stream of air better than other regions, the flow of air over the periphery of the wheel is not uniformly continuous, so that a pulsating or "tramping" action is set up producing undesirable vibrations in any motor including the wheel. With the turbine wheel of the invention, relatively uniform air flow characteristics over the turbine wheel have been noted, with minimizing or eliminating of such a pulsating or tramping action.

Wheels have been proposed where an exhaust for the gas or air driving the wheel is provided located near the axis of the turbine wheel. In order to simplify and to obtain a compact construction, and for other reasons, it is not always practicable to provide for such an exhaust passage. Another object of the invention is to provide an improved turbine wheel which operates efficiently with air being thrown off from the turbine wheel circumferentially, or from the same region of the wheel that receives air on such being introduced against the wheel to drive it.

These and other objects and advantages are attained by the invention, and the same is described hereinbelow in conjunction with the accompanying drawings, wherein.

Figure 1:
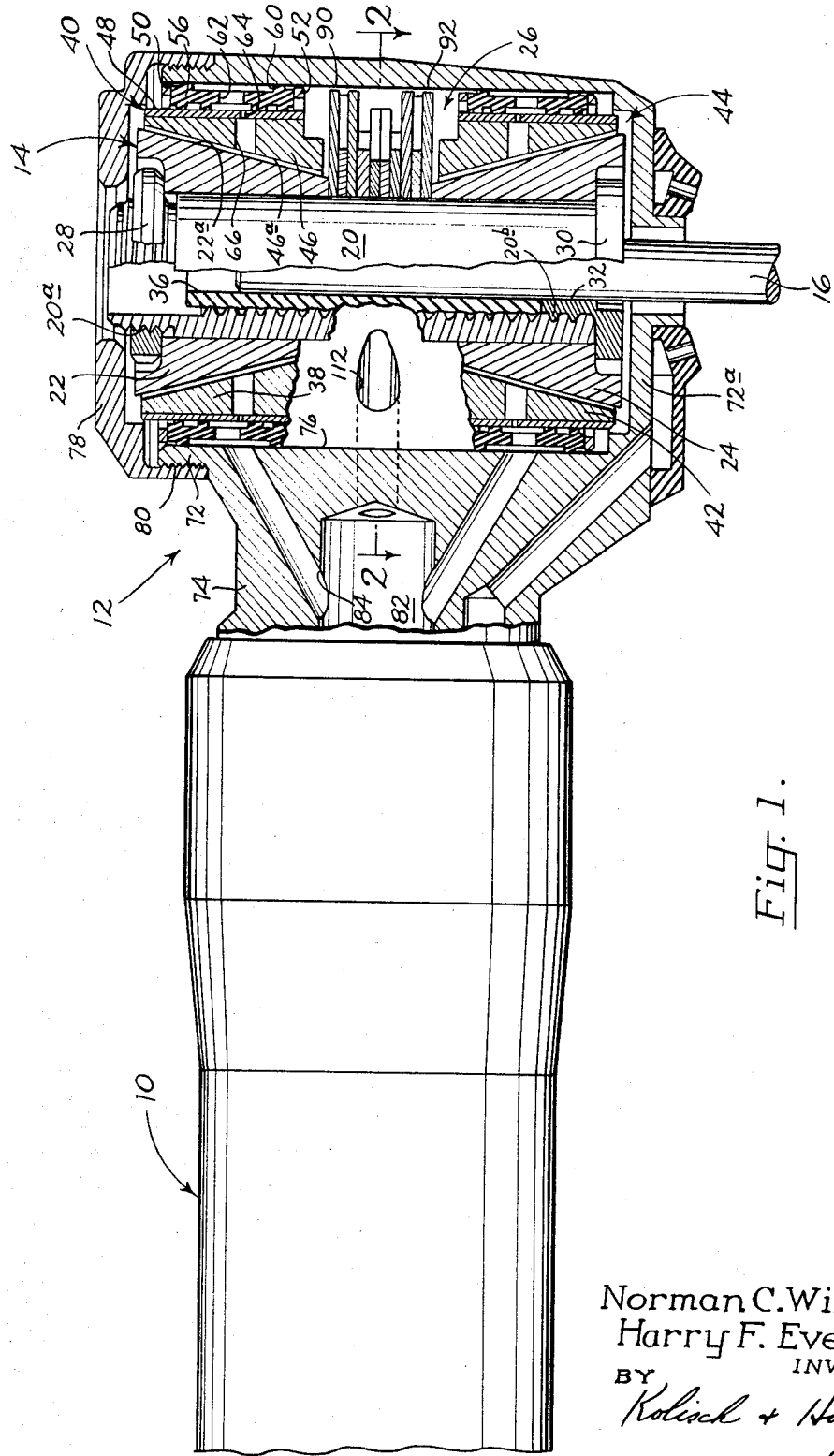
FIG. 1 illustrates, partially in cross section, a dental handpiece with a pneumatic motor including a turbine wheel as contemplated in a preferred embodiment of the invention.

In the drawings, the dental handpiece illustrated comprises a handle portion 10, and suitably mounted on this handle portion a so-called powerhead assembly 12 including a pneumatic motor 14. The motor when operating rotates at high speed a dental burr or cutter, the shank of which is partially shown at 16.

The pneumatic motor includes a rotor comprising an elongated, hollow spindle 20, a pair of rotor journals 22, 24 mounted on spindle 20 adjacent its ends, and a turbine wheel designated generally at 26 mounted on the spindle between rotor journals 22, 24. Clamping the rotor journals and turbine wheel securely in place on the spindle is a spindle nut 28 screwed onto an externally threaded portion 20a of the spindle at the spindle top and cooperating with a spindle retainer 30 at the spindle base screwed into internally threaded portion 20b.

The shank of burr or drill 16 extends upwardly through a bore 32 in the spindle retainer, and frictionally engages the inner wall of a tubular chuck element 36 made of an elastomeric material such as rubber. The chuck element itself fits tightly within the spindle on top of the spindle retainer.

Rotor journal 22 is disposed within an encircling stator bearing 38 and together with this stator bearing forms a gas bearing assembly depicted generally at 40 supporting the top end of the spindle in FIG. 1. Rotor journal 24 is mounted within a similar encircling stator bearing 42 and forms with this stator bearing a gas bearing assembly depicted generally at 44 supporting the base of the spindle in FIG. 1. The two gas bearing assemblies are similar in construction, and thus only one will be described in detail.

Referring to gas bearing assembly 40, rotor journal 22 is bounded around its outside by a frusto-conical surface 22a which tapers progressing axially inwardly on the spindle. Bearing 38 includes a liner 46 which is bounded around its inside by a frusto-conical surface 46a. Surfaces 22a, 46a are gas-bearing defining surfaces in the assembly, and together define an annular capillary space of tapered outline extending between the rotor journal and stator bearing for containing gas under pressure distributed as a supporting film.

Further describing gas bearing assembly 40, bearing 38 in addition to liner 46 includes a shell 48 mounted securely on the outside of the liner, which shell includes axially-spaced annular flanges 50, 52 defining an annular channel on the outside of the shell. A carrier ring 56 of elastomeric material, such as rubber, is seated within this channel.

Ring 56 includes spaced annular ridges defining on the outside of the ring an annular manifold space 60. Gas fed to manifold space 60 is supplied to the annular capillary space in the gas bearing by flowing through multiple ports 62 equally circumferentially distributed about the carrier ring, into an internal channel formed on the inside of the ring which communicates with multiple, equally circumferentially distributed choke passages 64 in shell 48. Each of such choke passages connects at its inner end with an expansion passage such as the one indicated at 66, and these expansion passages have inner ends communicating with the tapering annular capillary space in the bearing assembly.

Powerhead assembly 12 further includes casing structure comprising a housing portion 72 for the pneumatic motor and a substantially cylindrical boss 74 joined to portion 72. Housing portion 72 has an elongated, smooth-walled bore 76 extending down through the center thereof a substantial portion of its length. As seen in FIG. 1, the bottom end of this bore is closed off by an end wall or cover portion 72a of housing section 72. The opposite end of the bore in the housing section is closed off by a detachable cap or cover portion 78 which is internally threaded and screwed onto threads 80 provided as the top of the housing section. Bore 76 has a uniform diameter extending downwardly into the housing section from its openable upper end, permitting removal of the spindle, gas bearing assemblies and turbine wheel as a unit assembly after removal of the cap.

Air under pressure is supplied manifold space 60 from a supply bore or passage 82 in boss 74 which is connected to manifold space 66 by a feed passage 84. It should be understood, of course, that the usual source of compressed air is connected to the handpiece which communicates through a conduit (not shown) with bore 82.

The pneumatic motor, including the gas bearing assemblies which support the spindle, is described in some detail in a copending application entitled, "Pneumatic Motor," filed concurrently with this application.

As indicated above, this invention contemplates a viscous drag turbine wheel as the agency for rotating the spindle, characterized by a number of novel features producing smooth, efficient, and dependable operation. The turbine wheel is particularly useful in a motor of the type described, which features air bearing assemblies for supporting the spindle, and is sensitive to imbalance in the wheel, lack of uniform drag characteristics, and any pulsating or tramping action resulting in the air stream producing wheel actuation. The turbine wheel is also desirable in the instant organization, in that it operates efficiently without the necessity of providing any exhaust passages near the axis of the wheel for gas exhausting after driving the wheel.

Turbine wheel 26 includes opposed end shrouds 90, 92 which take the form of circular plates which are imperforate in a region extending in planes normal to the axis of the spindle. Between these shrouds, and extending in planes normal to the axis of the spindle, are a stack of discs shown at 96, 97, 98, 99, 100, 101, 102, and 103. These may all have the same shape and size.

Figure 2:
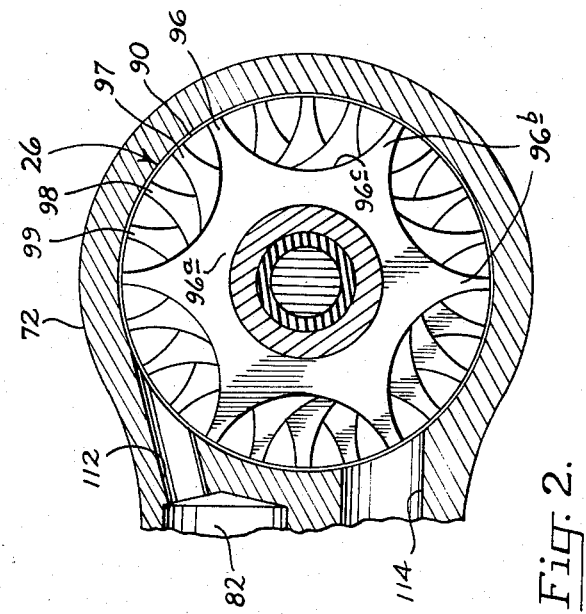
FIG. 2 is a cross-sectional view, taken generally along the line 2—2 in FIG. 1, illustrating the outline of discs in the turbine wheel and how the discs are stacked and angularly offset in the wheel.
Figure 3:
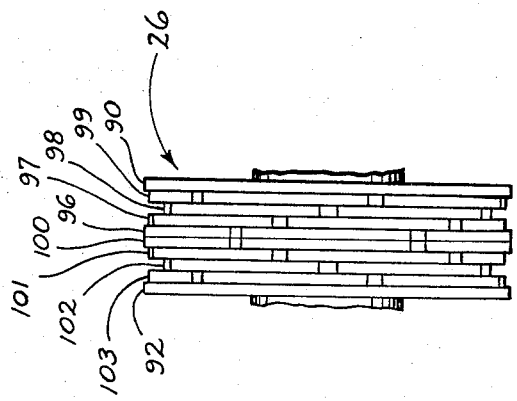
FIG. 3 is a side view of the turbine wheel removed from the handpiece.

Referring to FIG. 2, and describing one of such discs in detail (disc 96), each comprises a hub portion, such as that shown at 96a, and multiple arms, such as those shown at 96b, projecting radially outwardly from the hub portion. Six of such arms are shown for a disc in FIG. 2. The arms are equally circumferentially spaced about the axis of the hub and arbor.

The arms are separated around the perimeter of the disc by pockets 96c. These pockets in the preferred embodiment illustrated are arcuately defined, concave recesses which extend inwardly from the peripheral outline of the disc.

The discs are mounted on the arbor or spindle 20 with the disc 98 directly adjacent outer disc 99 offset angularly 15 degrees about the axis of the arbor or spindle, or one-fourth the angular distance between adjacent arms in a disc. Disc 97 which is the next adjacent disc is similarly offset 15 degrees relative to disc 98. Disc 96 is offset a similar amount from disc 97. Discs 96, 100 are disposed midway between the end shrouds, and are shown aligned.

Disc 101 is aligned with disc 97, disc 102 is aligned with disc 98, and disc 103 is aligned with disc 99. As a consequence, the discs disposed in the region extending from the middle of the wheel toward shroud 92 are offset the same as discs 96, 97, 98 and 99.

With such offset of the various discs, and because the distance between adjacent arms in a disc is substantially greater than the width of an arm, the pockets between directly adjacent discs communicate with each other to form a continuous void region on the periphery of the turbine wheel extending laterally from the plane of one disc into the plane of the adjacent disc. Because of the offset mentioned, this void region also extends in a circumferential direction. In effect, helical voids are present which extend about the turbine wheel inwardly from one end shroud, which intersect similar voids turning in the opposite direction, extending inwardly from the opposite end shroud. Defining the outlines of these helical voids are the sides of the arms which are sharply defined.

Air to drive the turbine wheel is channeled from supply passage 82 to a region adjacent the periphery of the turbine wheel in housing section 72 through a bore or passage 112. Providing an exhaust for such air is an exhaust passage or bore 114. This passage, while being visible in FIG. 2, is not shown in FIG. 1, by reason of portions of the casting structure containing the passage having been removed in this figure.

When a stream of air under pressure is discharged against the periphery of the turbine wheel through bore 112, irrespective of the particular position of the wheel, a plurality of arms from different discs are exposed to the air stream emanating from the bore directly adjacent its point of discharge. The stream of air impinges on these arms to urge rotation of the wheel. Air, after directly impinging upon an arm, in a highly turbulent type of flow, is displaced laterally and thence advances circumferentially over the wheel toward another exposed arm. Such air, on moving laterally of an arm, mixes with other turbulent air deflected from adjacent, laterally spaced arms. Because of the turbulence produced, and because arm exposure for direct impingement action is little affected by wheel position, the wheel is forced smoothly to rotate in a clockwise direction in FIG. 2 with little discernable pulsating action produced in the stream of air powering the wheel. With substantially equal resistance offered to air movement over the periphery of the wheel regardless of wheel position, the rotor on start-up does not lock in place (as sometimes is a tendency where gas bearing assemblies are employed), but always moves smoothly forwardly.

Considering any given region on the wheel's periphery, it has been found that there is an effective exhaust of air from such region on it moving to the vicinity of exhaust passage 114. The wheel thus operates well without the need of including a discharge passage near the axis of the wheel. This promotes compactness, and simplifies construction.

It should be obvious that the turbine wheel may be relatively easily manufactured and assembled. Discs shaped to requisite tolerances are readily prepared by cutting them from sheet material. On being assembled in the turbine wheel, a balanced wheel with pre-established operating characteristics results.

While a particular embodiment of the invention has been described, it should be obvious that modifications and variations are possible without departing from the invention. It is desired to cover all such modifications and variations as would be apparent to one skilled in the art, and that come within the scope of the appended claims.

It is claimed and desired to secure by Letters Patent:

1. A viscous drag turbine wheel comprising an arbor and multiple discs stacked side by side occupying planes substantially normal to the arbor mounted on the arbor; each disc comprising a hub and multiple radial arms joined to the hub, with successive arms separated in a circumferential direction by a pocket; the arms of adjacent discs being offset angularly about the axis of the arbor; the pockets of one disc having a dimension measuring circumferentially and at the periphery of the disc which is greater than the dimension of an arm measured in like manner at the periphery of the disc; each of the pockets of one disc in said turbine wheel communicating with pockets on either side of an arm in an adjacent disc thus to form a continuous void region on the periphery of the turbine wheel that twists helically in opposite directions by extending laterally from the plane of the one disc into the plane of the adjacent disc and circumferentially in opposite directions progressing from the one to the adjacent disc.

2. The turbine wheel of claim 1, wherein the arms of a disc are equally circumferentially spaced about the axis of the arbor.

3. The wheel of claim 1, which further comprises opposed shrouds of circular outline mounted on opposite sides of the stacked discs, said shrouds having circumferential margins spaced radially from the arbor axis at least as far as the radial spacing of the ends of the arms in said discs.

4. The wheel of claim 3, wherein the pockets separating the arms in adjacent discs are arcuately curved and have substantially the same shape and size, and the shrouds and discs are imperforate extending outwardly from the arbor.

5. The turbine wheel of claim 1, wherein the discs are substantially all of the same shape and size, the arms of a disc are equally circumferentially spaced about the axis of the arbor, the pockets separating the arms in a disc are arcuately curved and have substantially the same shape and size, the discs are imperforate extending out from the arbor, and which further comprises opposed shrouds disposed with one on one side and one on the other side of the stack of discs, said shrouds being imperforate extending out from the arbor and having circular outlines and circumferential margins spaced radially from the arbor axis at least as far as the radial spacing of the ends of the arms in said discs.

References Cited

UNITED STATES PATENTS

| | | |
|---|---|---|
| 702,461 | 6/1902 | Nadrowski. |
| 1,455,022 | 5/1923 | Dake. |
| 3,074,151 | 1/1963 | Kroeckel _____ 253—2 |

FOREIGN PATENTS

| | | |
|---|---|---|
| 692,456 | 8/1964 | Canada. |
| 1,071,275 | 12/1959 | Germany. |
| 165,931 | 6/1921 | Great Britain. |
| 186,082 | 9/1922 | Great Britain. |

EVERETTE A. POWELL, Jr., *Primary Examiner.*